United States Patent

[11] 3,597,819

[72] Inventor Hudson B. Scheifele
 30165 Ponds View Road, Franklin, Mich. 48025
[21] Appl. No. 870,681
[22] Filed Oct. 27, 1969
[45] Patented Aug. 10, 1971

[54] METHOD OF MAKING A COMPOSITE TAPERED ROLLER BEARING RACE
 9 Claims, 8 Drawing Figs.

[52] U.S. Cl. ................................................. 29/148.4 R
[51] Int. Cl. ......................................................B23p 11/00, B21h 1/12
[50] Field of Search............................................. 29/148.4 R, 148.4 A, 149.5

[56] References Cited
UNITED STATES PATENTS
3,229,353 1/1966 Morrison..................... 29/148.4 R

*Primary Examiner*—Thomas H. Eager
*Attorney*—Barthel & Bugbee

ABSTRACT: Suitable bearing race material is formed into bar stock having a longitudinally-oriented grain structure and having a cross section corresponding to the cross section of the prospective bearing race. From the thus-shaped bar stock are cut a plurality of pieces whose combined lengths substantially equal the circumferential length of the prospective bearing race. These pieces are then bent into circularly arcuate segments having curvatures corresponding to that of the prospective bearing race and having ends configured to fit one another. These segments are then aligned end-to-end in an annular path and welded together into an annular body which is then hardened and ground. This bar stock is provided with an inclined side surface which, for an outer race, becomes the inner surface of the segment, and for an inner race becomes the outer surface of the segment, in each instance constituting the roller path.

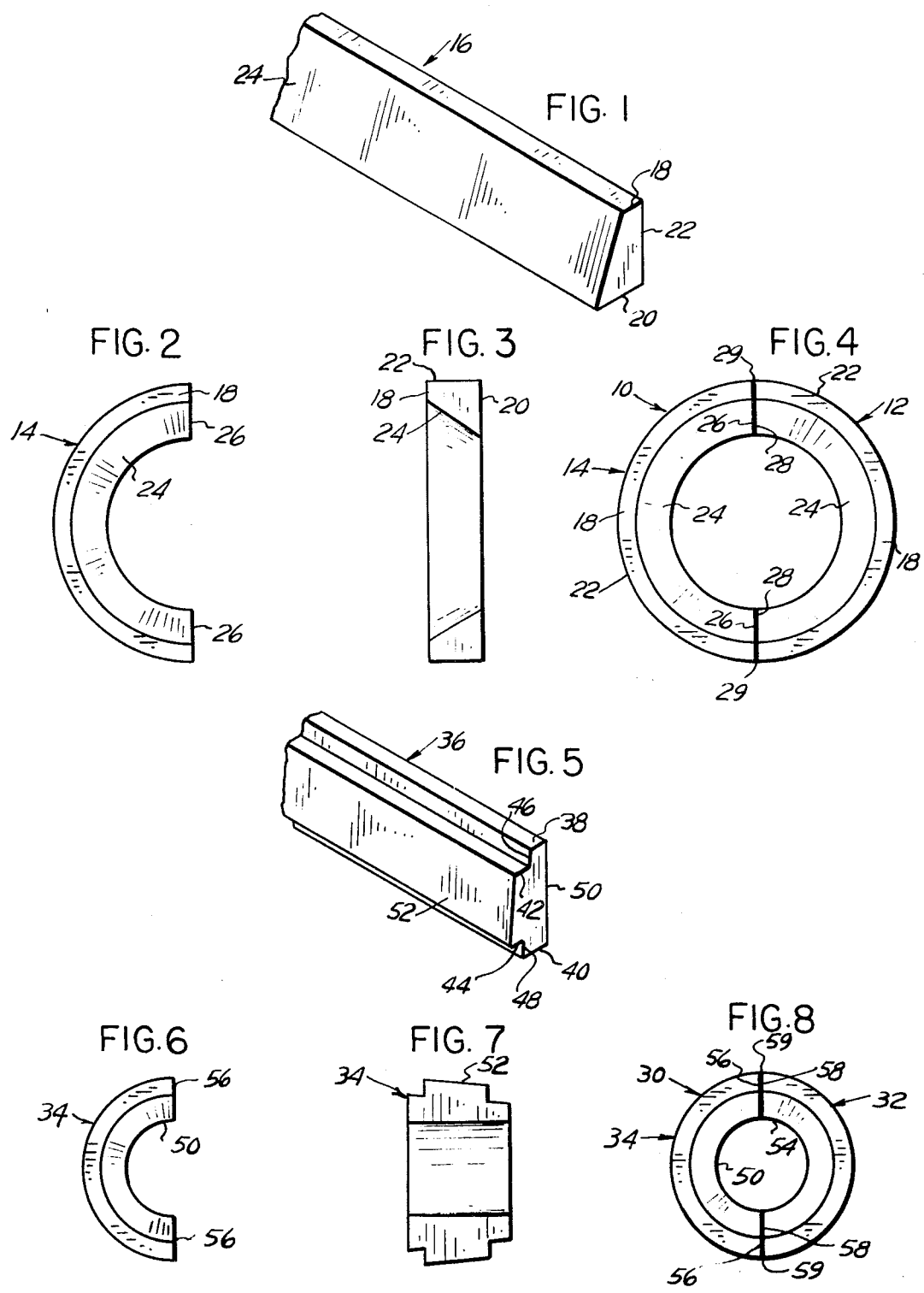

METHOD OF MAKING A COMPOSITE TAPERED ROLLER BEARING RACE

In the drawings:

FIG. 1 is a perspective view of a portion of rolled outer race bar stock;

FIG. 2 is a front elevation of an outer bearing race half formed from a portion of the bar stock of FIG. 1;

FIG. 3 is a right-hand end elevation of the outer bearing race half shown in FIG. 2;

FIG. 4 is a front elevation of a composite outer bearing race formed from a right-hand and a left-hand outer bearing race half butt welded to one another;

FIG. 5 is a perspective view of a portion of rolled inner race bar stock;

FIG. 6 is a front elevation of an inner bearing race half formed from a portion of the bar stock of FIG. 5;

FIG. 7 is a right-hand end elevation of the inner bearing race half shown in FIG. 6; and FIG. 8 is a front elevation of a composite inner bearing race made from a right-hand and a left-hand inner bearing race half butt welded to one another.

Referring to the drawings in detail, FIG. 4 shows a composite tapered roller bearing outer race, generally designated 10, according to one form of the invention as consisting of a right-hand half 12 and a left-hand half 14, each of semiannular form and joined to one another in the manner described below. It will be understood that the terms "right hand" and "left hand" are purely relative depending upon which side of the race 10 the observer is facing. To produce the composite outer race 10, straight bar stock 16 is shaped in any suitable manner (FIG. 1) such as by rolling suitable bearing material, for example steel, in a conventional rolling mill (not shown) to form parallel faces 18 and 20 perpendicular to a face 22 and disposed at obtuse and acute angles respectively to an inclined face 24.

The bar stock 16 is severed into portions which are equal in length to the circumferential length of a half-annular portion of the eventual bearing race to be made, such as in a suitable bending die, thereby producing the semiannular left-hand outer bearing race 14 shown in FIGS. 2 and 3. The right-hand outer bearing race half 12 is formed by a similar procedure but by bending the portion of bar stock 16 in the opposite direction. The face 22 thus becomes the outer semicylindrical surface of the bearing race half 12 or 14, the inclined surface 24 becomes the roller path surface, and the faces 18 and 20 remain flat and parallel to one another. The opposite end surfaces 26 become flat diametral end surfaces.

The right-hand outer bearing race half 12 has similarly disposed surfaces 18, 20, 22 and 24 and similar end surfaces 28 (FIG. 4). The surface 20 of the right-hand bearing race 12 is not visible in FIG. 4. The outer bearing race halves 12 and 14 are then assembled with their end faces 26 and 28 in abutting engagement with one another and with the two halves 12 and 14 so aligned that their outer and inner surfaces 22 and 24 and their side surfaces 18 and 20 merge smoothly and continuously into one another. This is done by placing them in a suitable aligning fixture (not shown) provided for that purpose. The end faces 26 and 28 are then butt welded at 29 to one another while in their aligned positions to form the composite outer bearing race 10, which is then hardened by suitable heat treatment and ground to its finished form.

Referring now to FIG. 8, there is shown therein a composite tapered roller bearing inner race, generally designated 30, consisting of a right-hand half 32 and a left-hand half 34, each of semiannular form and joined to one another also in the manner described below. To produce the composite inner race 30, straight bar stock 36 is formed in any suitable manner, such as by rolling suitable bearing material, for example steel, in a conventional rolling mill (not shown) to form parallel faces 38 and 40 (FIG. 5) with parallel-shouldered faces 42 and 44 in stepped relationship thereto and joined thereto by perpendicular surfaces 46 and 48 respectively. The surfaces 38 and 40 are formed perpendicular to a base 50 and disposed at obtuse and acute angles respectively to an inclined face 52.

The left-hand inner race half 34 is formed from the semicircumferential length of bar stock 36 by bending such a bar stock portion in a suitable bending or forming die to convert it into the semiannular member shown in FIGS. 6 and 7. Here, the face 50 becomes the semicylindrical portion of the shaft bore 54 whereas the inclined face 52 becomes the semiconical roller path 52. The right-hand inner bearing race half 32 is made in a similar manner but by bending the bar stock portion in the opposite direction. The end faces 56 are disposed in alignment with one another in the left-hand half 34 and the end faces 58 of the right-hand half race 32 are similarly disposed. Both pairs of end faces 56 and 58 are diametral. The right-hand and left-hand inner race halves 32 and 34 are then placed in a suitable aligning fixture which holds them with their various surfaces in aligned positions, whereupon the end faces 56 and 58 are then butt welded at 59 to one another in their aligned positions. The composite inner race 30 is then hardened by heat treatment and ground to its finished form.

The composite outer and inner bearing races 10 and 30 are used in the manner of conventional tapered roller bearing races by placing a full complement of tapered rollers in the annular space between them. The composite races 10 and 30 of the present invention, however, possess the particular advantage that as their grain structure extends longitudinally in the bar stock 16 and 36 from which they were formed, this grain structure extends circumferentially in the finished bearing race 10 or 30 and therefore imparts to the bearing race exceptional qualities of wear resistance and load sustaining which are superior to conventional bearing races not so constructed, but having noncircumferentially disposed grain structures.

I claim:

1. A method of making a composite tapered roller bearing race with a circumferentially oriented grain structure, said method comprising forming suitable bearing race material into elongated bar stock having a longitudinally extending grain structure and having a cross section corresponding to the cross section of the prospective bearing race, severing from said bar stock a plurality of elongated pieces having combined lengths substantially equal to the circumferential length of the prospective bearing race, bending said pieces into circularly arcuate segments having curvatures corresponding to the curvature of the prospective bearing race and having ends configured to mate with one another, aligning said segments end-to-end in an annular path, welding said aligned segments end-to-end into an annular body possessing the configuration of the prospective bearing race, hardening said annular body, and surface finishing said annular body.

2. A method, according to claim 1, wherein the plurality of elongated pieces constitute a pair of such pieces, each piece having a length substantially equal to one-half of the circumferential length of the prospective bearing race.

3. A method, according to claim 2, wherein the ends of the segments are formed to lie in diametral planes.

4. A method, according to claim 1, wherein said surface finishing is effected by grinding.

5. A method, according to claim 1, wherein said bar stock is formed with an approximately trapezoidal cross section with two surfaces thereof disposed substantially perpendicular to one another and with a third surface inclined relatively to said two surfaces.

6. A method, according to claim 5, wherein said pieces are bent into circularly arcuate segments with said inclined surfaces on the inner sides thereof for producing an outer bearing race with a tapered inner roller path.

7. A method, according to claim 5, wherein said pieces are bent into circularly arcuate segments with said inclined surfaces on the outer sides thereof for producing an inner bearing race with a tapered outer roller path.

8. A method, according to claim 5, wherein said pieces are formed with stepped portions on opposite sides of said inclined third surface.

9. A method, according to claim 7, wherein said surface finishing includes grinding the internal surface of said body to a cylindrical configuration.